US005793594A

United States Patent [19]

Niemira et al.

[11] Patent Number: 5,793,594

[45] Date of Patent: Aug. 11, 1998

[54] PREDICTIVE CONTROL CIRCUIT AND METHOD FOR CIRCUIT INTERRUPTER

[75] Inventors: James K. Niemira, Skokie; Raymond P. O'Leary, Evanston, both of Ill.

[73] Assignee: S&C Electric Company, Chicago, Ill.

[21] Appl. No.: 576,247

[22] Filed: Dec. 21, 1995

[51] Int. Cl.[6] .................................................. H02H 3/00

[52] U.S. Cl. .................................................. 361/93; 361/87

[58] Field of Search .......................... 361/57, 87, 93–97, 361/170, 185, 187; 307/134, 137, 87; 364/483; 327/78

[56] References Cited

U.S. PATENT DOCUMENTS 3,808,455 4/1974 Leisi .................................. 307/134

4,916,573 4/1990 Ruta .................................. 361/93

*Primary Examiner*—Ronald W. Leja

*Attorney, Agent, or Firm*—James V. Lapacek

[57] ABSTRACT

A control circuit and method are provided for a circuit interrupter that predicts the occurrence of fault-current zero crossings. This prediction is utilized to control the operation of a circuit interrupter at a desirable point in the periodic wave form of the fault current. For example, the control circuit is useful to control a synchronous interrupter by accurately generating a trip signal to the synchronous interrupter for operation in the vicinity of the zero crossing of the current wave form. In a preferred arrangement, the control circuit utilizes the quotient of a sensed current signal and the time rate of change of the sensed current signal. In one specific arrangement for circuit environments that might include conditions that could lead to false results, the time rate of change of the quotient is utilized to provide a control signal.

8 Claims, 2 Drawing Sheets

PREDICTIVE CONTROL CIRCUIT AND METHOD FOR CIRCUIT INTERRUPTER

BACKGROUND OF THE INVENTION

1. Field of the Invention

The present invention relates generally to control circuits for circuit interrupters and more particularly to a control circuit and method that predicts the occurrence of zero crossings, especially under fault conditions, so as to control the operation of a circuit interrupter at a desirable point in the periodic wave form of the fault current, this type of control arrangement being especially useful for synchronous interruption.

2. Description of Related Art

Various control circuits, circuit interrupters, and control arrangements are known that respond to the presence of overcurrents in electrical power transmission and distribution lines, these overcurrents also being referred to as fault conditions or fault currents. For example, one category of control circuits operates in accordance with one or more modes including instantaneous (i.e. without intentional delay) and/or inverse modes where a trip signal is generated based on the combination of time and current in accordance with predetermined time-current characteristics.

Another category of control circuit described in U.S. Pat. Nos. 4,916,573, 4,571,658 and 4,642,724 respond to the sensed current in a line in various manners so as to control operation of a circuit interrupter to interrupt the overcurrent at an appropriate portion of the periodic wave form. For example, when the incipient stages of an overcurrent condition are detected by predictive parameters such as the rate of change of the current, a trip signal is generated to operate the circuit interrupter such that the instantaneous current is interrupted while in an acceptable range. This type of control arrangement includes provisions to operate either before the actual occurrence of the peak values of the overcurrent or during successive cycles at an appropriate point in the wave form when the instantaneous current is within an acceptable range.

Yet another category of control circuit utilizes so-called "predictive" algorithms or arrangements. Some of these so-called predictive arrangements compare the current wave form with stored parameters (in either digital or analog format) and predict the occurrence of an overcurrent when the current wave form exceeds or is unexpectedly different from the stored parameters. For example, see U.S. Pat. No. 4,000,950. In U.S. Pat. No. 4,733,321, when high currents may be present, the threshold level for operation of an instantaneous trip signal generator is lowered.

One technique used to operate synchronous interrupters is the detection of zero crossings of the current wave form so that interruption can occur at low values of current. For example, a zero-crossing detector is shown in U.S. Pat. No. 3,693,027. Zero-crossing detectors utilized in transfer switches and discharge detectors are shown in U.S. Pat. Nos. 5,200,737 and 5,182,464.

While the prior art arrangements may be useful to control circuit interrupters in various applications, they may not be sufficiently accurate so as to provide reliable trip control signals in the presence of overcurrents when harmonics are present as part of inrush and outrush current conditions caused by the presence of capacitor banks and the like.

SUMMARY OF THE INVENTION

Accordingly, it is a principal object of the present invention to provide a control circuit for a circuit interrupter that predicts the occurrence of fault-current zero crossings so as to be capable of controlling the operation of a circuit interrupter at a desirable point in the periodic wave form of the fault current, e.g. controlling a synchronous interrupter by accurately generating a trip signal to the synchronous interrupter for operation in the vicinity of the zero crossing of the current wave form.

It is another object of the present invention to provide a control circuit for a circuit interrupter that utilizes decision control means that is responsive to the current in a line for detecting the occurrence of overcurrents and predicting the time of occurrence of a zero-crossing of the periodic wave form to generate a trip signal.

These and other objects of the present invention are efficiently achieved by the provision of a control circuit for a circuit interrupter that predicts the occurrence of fault-current zero crossings. This prediction is utilized to control the operation of a circuit interrupter at a desirable point in the periodic wave form of the fault current. For example, the control circuit is useful to control a synchronous interrupter by accurately generating a trip signal to the synchronous interrupter for operation in the vicinity of the zero crossing of the current wave form. In a preferred arrangement, the control circuit utilizes the quotient of a sensed current signal and the time rate of change of the sensed current signal. In one specific arrangement for circuit environments that might include conditions that could lead to false results, the time rate of change of the quotient is utilized to provide a control signal.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
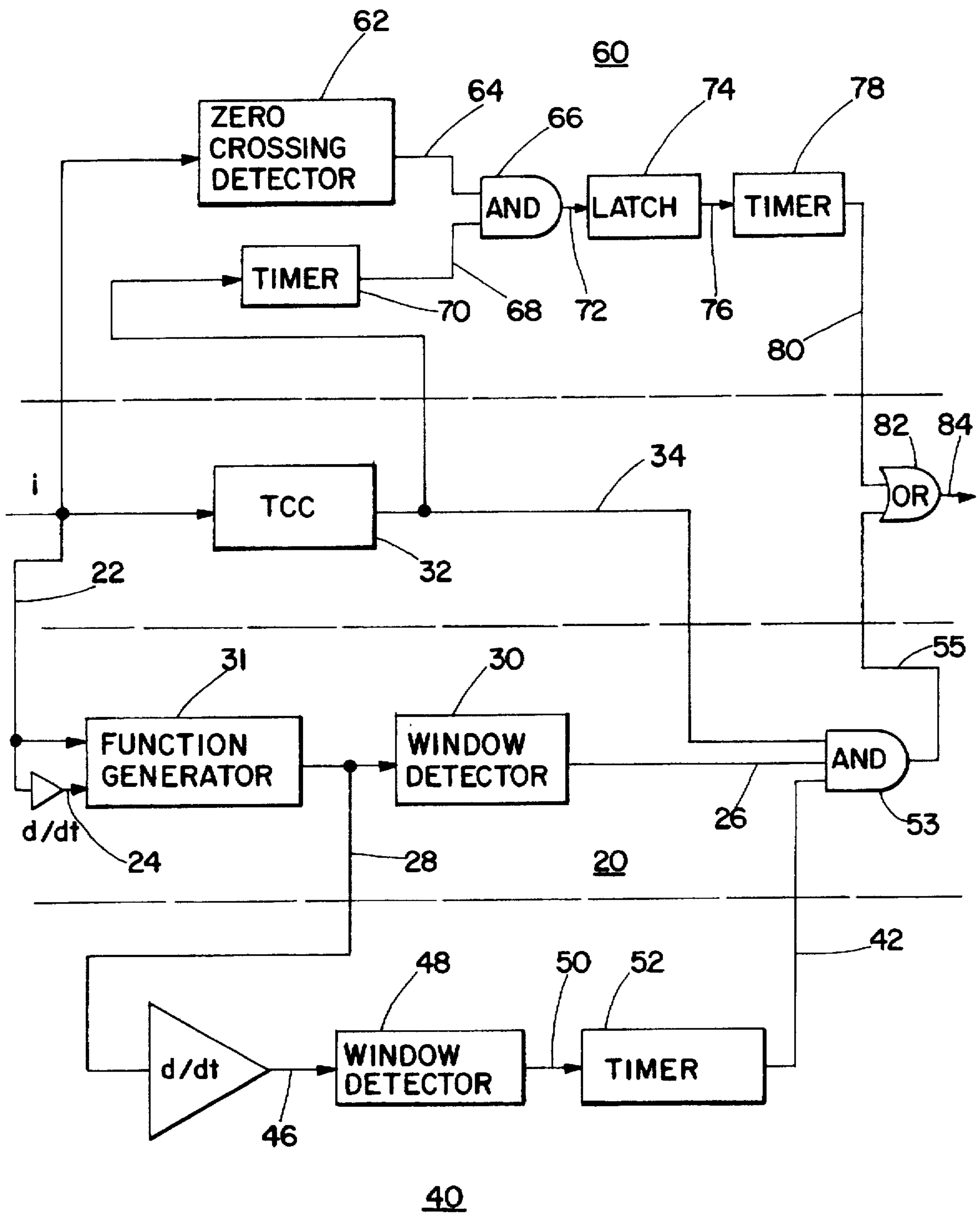
FIG. 1 is a block diagram representation of a control circuit in accordance with the principles of the resent invention.

Referring now to FIG. 1, an illustrative control circuit in accordance with the principles and features of the present invention includes a current zero predictor, generally referred to at 20. The current zero predictor 20 is responsive to a sensed current signal at 22 and a time derivative of the sensed current signal at 24 and is effective to provide a current zero prediction signal at 26. The current zero prediction signal at 28 is useful in the presence of fault currents to control the operation of a synchronous interrupter. Specifically, the current zero predictor 20 utilizes the quotient of sensed current and the rate of change of the sensed current to develop a predictive time to the current zero signal at 28.

In order to provide a signal that accounts for the operating time of the synchronous interrupter and occurs during an appropriate operational status of the synchronous interrupter, the current zero predictor 20 includes a window detector 30. The window detector 30 provides a signal when the predictive time signal at 28 is within an appropriate range that corresponds to the desired range of operating time of the synchronous interrupter. The predictive time signal at 28 is provided at the output of a function generator 31 which includes as inputs the sensed current signal at 22 and the time derivative of the sensed current signal 22 at 24. The function generator 31 operates to provide the quotient of the sensed current at 22 and the time derivative at 24.

Figure 2:
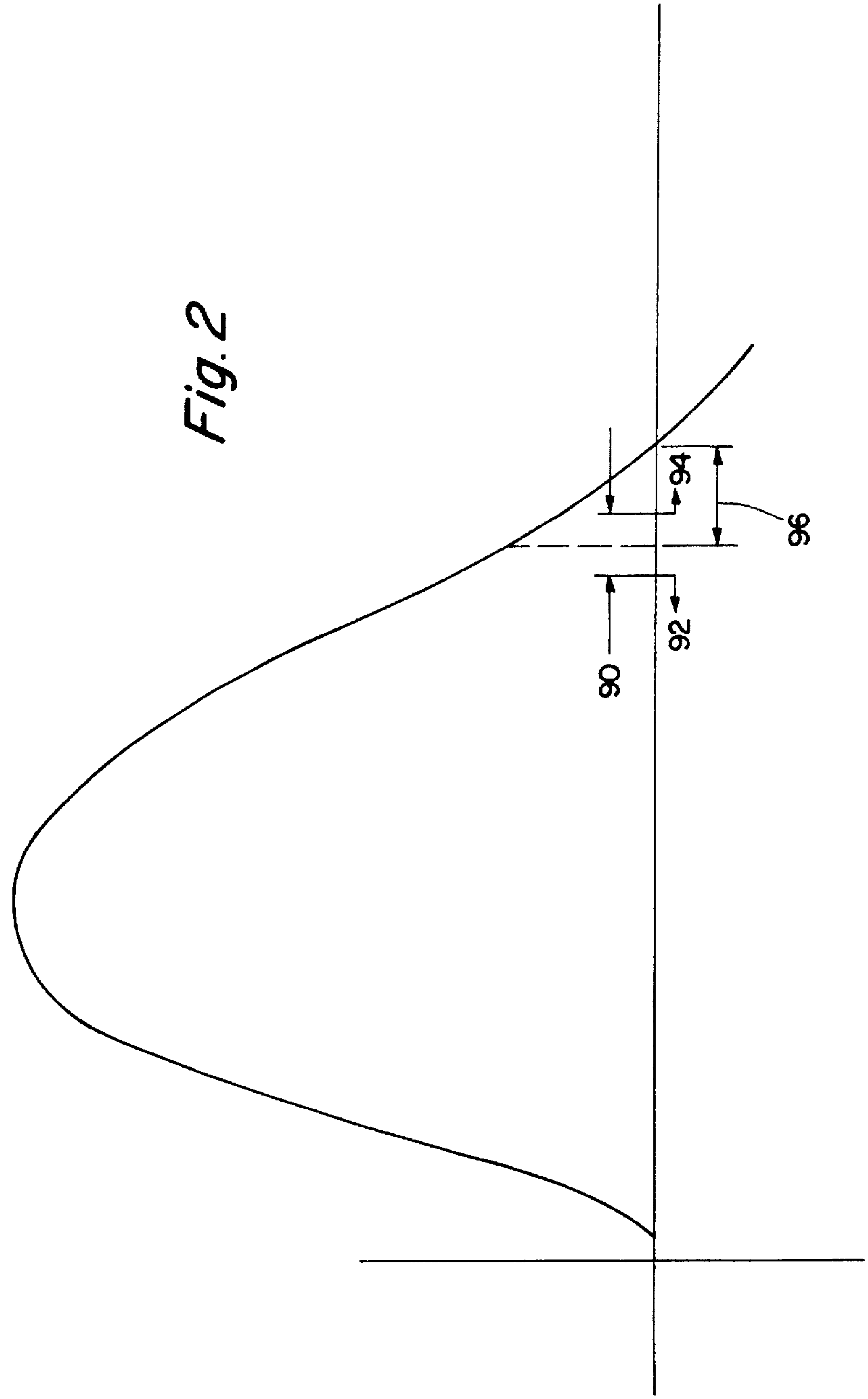
FIG. 2 is a diagrammatic representation of an overcurrent wave form illustrating operational parameters of the control circuit of FIG. 1.

For example, and referring now additionally to FIG. 2, the predictive time signal is shown so as not to operate the synchronous interrupter too soon or too late, but within the desired window or range of acceptable operation referred to at 90 in FIG. 2. That is, the signal must not occur too early (e.g. before 92) to the extent that the synchronous interrupter might be operated to attempt current interruption (by achieving too large a gap before current zero) while the current is still high enough within the loop of current before current zero to cause deleterious arcing within the open gap of the interrupter, i.e. full stroke before current zero. Further, the signal must not occur too late in the current loop (e.g. after 94)such that the interrupter (due to the required opening time) would not achieve a sufficient open gap to withstand the recovery voltage including transient recovery effects. In FIG. 2, the time to achieve the optimum gap for an illustrative interrupter is referred to at 96. In a specific example for use in operating a circuit interrupter of the type illustrated in U.S. Pat. No. 4,572,933, the range of the window detector 30 is approximately 500–650 microseconds.

In accordance with important aspects and additional features of the present invention, while the current zero prediction signal at 26 is generally accurate and reliable under a variety of circuit conditions, there are certain conditions under which the current zero prediction signal 26 may be affected or influenced. For example, such conditions include the presence of inrush currents due to energization of transformers or shunt capacitor banks. Other conditions include the outrush current of a capacitor bank into a fault elsewhere on the power system.

To this end, the control circuit also includes a time-current-characteristic stage 32 that provides an output at 34 that is logically "ANDED" with the current zero prediction signal 26 such that the combined signal is less susceptible to these inrush or outrush current conditions. The time current characteristic of the stage 32 may be any of a variety of conventional functions that provide an output in response to predetermined conditions, e.g. inverse, instantaneous, and combinations thereof In a specific embodiment, the time-current-characteristic stage 32 includes a narrow band pass filter that is centered around the fundamental frequency of the power-current wave form, e.g. 60 Hz. Accordingly, the stage 32 will respond only to the fundamental overcurrents. In this way, the combination of the signals at 34 and 26 is even more immune or impervious to harmonic and inrush currents.

In accordance with additional aspects and features of the present invention, the control circuit also includes provisions to make it less susceptible to the outrush current of a capacitor bank into a fault elsewhere on the power system. Specifically, a control section 40 provides a stabilizing signal at 42 that is logically "ANDED" with the signals 26 and 34. The stabilizing signal at 42 is derived as the rate of change of the current zero predictive signal at 28. When the rate of change of the current zero predictive signal at 28 is within a selected range of values for a predetermined time interval, the stabilizing signal at 42 is active.

In a specific embodiment, the control section 40 includes a differentiating stage 44 that provides an output at 46 that is the time rate of change of an input at 28. The output at 46 is provided as the input to a window detector 48 which provides an output at 50 when the signal at 46 is within a selected range of values. For example, in a specific example, the range is approximately −2.5 to −0.7. The output at 50 is provided as an input to a timer stage 52 which provides the output at 42 when the signal at 50 is true throughout a preselected time interval. For example, in a specific example, the preselected time interval is approximately 800 microseconds. Thus, to provide a combined control signal, the signals 26, 34, and 42 are connected as inputs to an "AND" gate 53 to provide a combined trip signal at 55.

In accordance with yet additional aspects and features of the present invention, on some power systems where there are significant magnitudes of harmonic current, the control circuit is provided with a parallel detection path via a detection stage 60. The detection stage 60 is useful under conditions of high harmonic current which might inhibit the operation of the control section 40.

In a specific embodiment, the detection stage 60 includes a zero-crossing detector 62 which is responsive to the sensed current signal at 22 to provide a zero-crossing detection signal at 64. The zero-crossing detection signal at 64 is logically "ANDED" in a gate 66 with a second input at 68 that is provided at the output of a timer stage 70. The timer 70 delays the TCC signal at 34 for a selected delay interval. The selected delay interval corresponds to a predetermined number of loops of the current, e.g. 1–5, which is appropriate for the expected circuit conditions. The combined signal 72 at the output of the gate 66 is input to a latch 74. The output 76 of the latch 74 is provided as an input to a timer 78. The timer 78 delays the signal at 76 for one period (two current loops) at the fundamental frequency of the current wave form so as to provide at an output 80 a control signal at the next current zero for operation of the synchronous interrupter if the logically "ANDED" combination of the signals at 55 has not yet been active to operate the interrupter. In order to provide a combined trip signal, the control circuit includes an "OR" gate 82 with the signals 55 and 80 as inputs, thus providing a combined trip signal at 84.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed and desired to be secured by Letters Patent of the United States is:

1. A decision control arrangement for a circuit interrupter responsive to current in a line having a fundamental frequency, the decision control arrangement comprising decision control means responsive to an overcurrent condition in a line for predicting the time of occurrence of the zero-crossing of the overcurrent based on the quotient of a sensed current signal and the time rate of change of the sensed current signal and means responsive to said quotient for generating a first signal by combining said quotient and a second signal derived from the time rate of change of said quotient.

2. The decision control arrangement of claim 1 further comprising means for utilizing said quotient only if said quotient is within a selected range of values.

3. The decision control arrangement of claim 1 wherein said second signal is based on said time rate of change of said quotient being within a selected range of values throughout a predetermined time interval.

4. The decision control arrangement of claim 1 further comprising detection means for detecting a zero crossing of the overcurrent condition in the line and providing a zero-crossing output at the predicted time of the next successive zero-crossing after the detection of the overcurrent condition.

5. The decision control arrangement of claim 4 wherein said zero-crossing output of said detection means is rendered operative only after said first signal is not generated within an anticipated time period.

6. The decision control arrangement of claim 1 wherein said decision control means further comprises time-current-characteristic means for determining the occurrence of an overcurrent condition after predetermined time-current-characteristics are satisfied.

7. The decision control arrangement of claim 6 wherein said time-current-characteristic means further comprises means for rendering said time-current-characteristic means less responsive to frequencies other than the fundamental frequency of the current in the line.

8. A method for operating a circuit interrupter comprising the steps of predicting the time of occurrence of the zero-crossing of an overcurrent condition based on the quotient of a sensed current signal and the time rate of change of the sensed current signal; and providing a first signal that represents the combination of the quotient and a second signal representing the time rate of change of the quotient.

* * * * *